Sept. 15, 1942.   C. M. SLACK ET AL   2,295,694
WATER VAPOR GETTER
Filed June 19, 1941
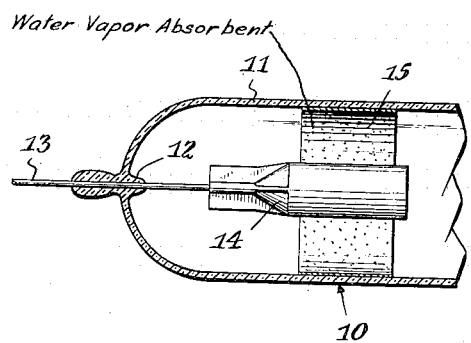
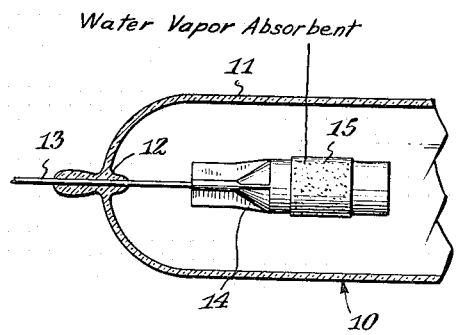
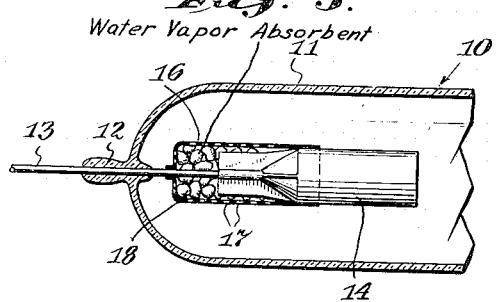
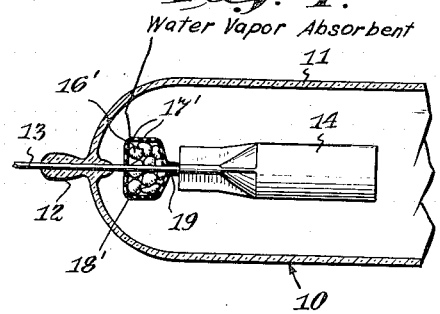
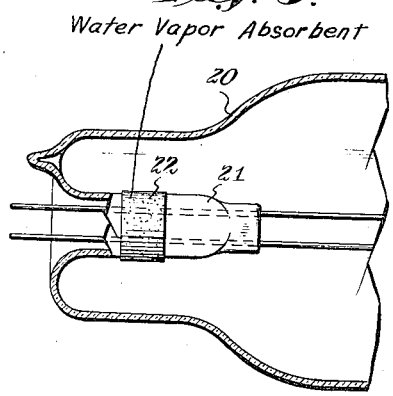
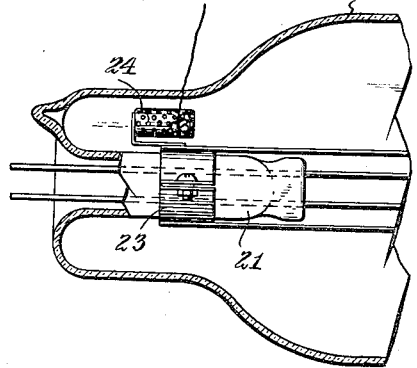
INVENTOR
C. M. SLACK
L. F. EHRKE
BY
ATTORNEY Patented Sept. 15, 1942

2,295,694

UNITED STATES PATENT OFFICE 2,295,694

WATER VAPOR GETTER

Charles Morse Slack, Glen Ridge, and Louis Frederick Ehrke, Newark, N. J., assignors to Westinghouse Electric & Manufacturing Company, East Pittsburgh, Pa., a corporation of Pennsylvania Application June 19, 1941, Serial No. 398,746

9 Claims. (Cl. 250—27.5)

This invention relates to getters for use in the lamp, radio tube or other industry wherein an absorption of residual vapor or the like is required within a sealed container or envelope.

While it has been common practice in the lamp and allied industries to employ various methods for the chemical or physical elimination or counteraction of gaseous or vapor content of deleterious nature in envelopes or bulbs, those in use have not been fully satisfactory, especially in respect to the water vapor content. The absorption of water vapor by getters heretofore used has not been fully accomplished, although it is a known fact that water vapor is deleterious in lamps, tubes and the like, and is most troublesome to eliminate. A selected getter as a drying agent certainly should not introduce other objectionable matter or gases and, to be most advantageous, should lend itself to ready application and be normally chemically inert or reasonably so. The trend of prior practice has been utilization of getters in the form of a small quantity of material, usually a pellet, which is "flashed" within the container or envelope. The "flashing" is similar to an explosion, exhibiting sudden occurrence and marked violence. There is consequently a tendency for a flashed getter to spatter, thereby introducing ill effects such as changing electrode characteristics, causing electric or discharge leakage, introducing discoloration or even breakage of the glass, and otherwise lessening the desirability or effectiveness of the product. The problem of elimination of water vapor has proven to be of even greater difficulty of solution with respect to gaseous discharge lamps, such as mercury arc, fluorescent and sterilizing lamps and the like.

It is accordinigly an object of the present invention to provide a getter that will be active as an absorbent for water vapor in the presence of mercury vapor or the like, and not be physically or chemically affected by the mercury or mercury vapor.

Supplementary to the foregoing object is the further desideratum that the getter should be absorptive at low vapor pressure.

Another object of the invention is to provide a getter which will absorb water vapor at extremely high vacuum as well as in the case where mercury or other ion-promoting vapor or gas is present, and as well as in incandescent lamps, both vacuum and gas filled.

A further object of the invention is to provide an absorptive or vapor-counteracting getter which does not require "flashing," and performs its function within the range of room temperature to usual temperatures employed during manufacture of a lamp or the like.

A still further object of the invention is to provide a getter which is chemically inert but is absorptive of deleterious vapor and may be rendered more absorptive by activation and/or reactivation.

Another object of the invention is to provide an activated getter the activation whereof may be renewed or increased after the getter is in place in its container or envelope but before the envelope is sealed-off from the exhaust system.

An important feature of the invention is the discovery that commercially available activated alumina fulfills the several requirements recited in the foregoing objects.

Still further objects of the invention will appear to those skilled in the art as the description progresses, both by direct statement thereof and by implication from the context.

In the accompanying drawing, wherein like numerals of reference indicate similar parts throughout the several views, and wherein the invention is disclosed in a few only of the many possible physical embodiments;

Figure 1 is a longitudinal sectional view of a portion of an envelope for a lamp or the like and showing our improved getter coated on a part of the inner surface of the envelope;

Figure 2 is a longitudinal sectional view of a similar portion of an envelope, and showing our improved getter coated on a part of an electrode of the lamp;

Figure 3 is a longitudinal sectional view of a similar portion of an envelope, showing a perforated shell carried by the electrode and containing the getter in granular or lump form;

Figure 4 is a longitudinal sectional view of a similar portion of an envelope, showing a perforated shell carried by the lead-in wire and containing the getter in granular or lump form;

Figure 5 shows an envelope having a re-entrant stem and having a band therearound on which our improved getter is coated, and Figure 6 shows a similar envelope which is, however, equipped with an electrode-mounting collar on the re-entrant stem, and showing a perforated case or shell supported from the collar and containing our improved getter in granular or lump form.

In the specific embodiment of the invention illustrated in said drawing, and with attention directed initially to Figures 1 to 4 thereof, the reference numeral 10 designates in general a lamp, and more particularly in this instance a gaseous discharge lamp, or yet more precisely, a mercury vapor lamp. For purposes of the present disclosure, it may be stated that the lamp, except as to the getter, is of well known construction, having a glass or other transparent or translucent envelope 11 with a suitable stem 12 at each end and by which lead-in wires 13 are sealed in passage to the interior for conducting electric current to electrodes 14 mounted on said lead-in wires. The envelope is preferably evacuated and then gas filled, as by neon, argon, etc., with addition of a few drops of mercury or other substance capable of producing ionization and promoting illumination by its vapor.

In Figures 1 and 2, our improved getter is of a granular character, mixed with a binder, and applied in place preferably before the binder hardens so that the same binder holding the granules together also constitutes the adherent for mounting the getter in the lamp. In Fig. 1, the mixed and adhering getter and binder 15 is shown applied as a circumferential band on the inside wall of the envelope near one end thereof. In Figure 2, the mixed and adhering getter and binder 15 is shown applied as a circumferential band on an electrode 14.

The getter which we prefer to use, and which we have discovered fulfills the purpose most proficiently and satisfactorily, is commercially available activated alumina. There are numerous processes for the manufacture of alumina, the ultimate product being characterized by its mode of manufacture. Generally speaking, alumina is available on the market in a porous constituency ranging in size from fine granules to chunks perhaps as large as an inch and a half. This form of alumina is commonly referred to as granular or lump alumina. The larger chunks may be crushed, if desired, and the mass can be mechanically screened and graded and utilized as a getter in accordance with our invention. As thus manufactured, the alumina has absorptive characteristics, and is rendered even more so by certain processes of manufacture and sold in trade as activated alumina.

It is reported that activated alumina is a by-product from the Fickes-Sherwin process of precipitation of alumina hydrate in the manufacture of metallic aluminum, from a solution containing sodium aluminate and aluminum hydrate. During that process a scale is deposited, and it is this scale which is utilized in preparation of activated alumina. The scale is calcined for a period of one or two hours at a temperature between 300° C. to 800° C., the range of 350°–400° being preferable as the calcining region effecting maximum activation. The resultant product is known as activated alumina, and consists of nearly pure alumina ($Al_2O_3$) with perhaps as much as 1% soda ($Na_2O$) and traces not exceeding 0.1% of silica ($SiO_2$) and ferric oxide ($Fe_2O_3$) and 0.01% of titania ($TiO_2$).

It is this activated alumina which we prefer to employ in connection with our invention. Furthermore, it is preferably the reasonably fine granular constituency of the activated alumina which we have adopted for use in the showings of Figures 1 and 2, as distinguished from the considerably larger fragments or chunks mentioned. The alumina in its granular form can be readily mixed with a binder and the mixture applied as a band in a suitable position, as for instance in the manner illustrated.

Again, for purposes of mounting the activated alumina in a lamp, the same may be placed within a perforated shell or case and the shell or case suitably secured within the lamp envelope. The size of fragments of the activated alumina employed should of course be selected as larger than the chosen size of perforation in the shell. In Figure 3, accordingly a case or shell 16 there shown has perforations 17 therethrough too small for passage of the lumps or granules of the activated alumina 18 in the shell. The shell has a cylindrical wall and an end wall concentrically situated around the lead-in wire. The end of the cylindrical wall opposite from said end wall is telescoped upon and secured to the lamp electrode, thereby both closing the end of the shell and mounting the shell in place.

In Figure 4 is shown a somewhat similar case or shell 16' having perforations 17' therethrough too small for passage of the selected size of the activated alumina 18' in the shell. In this instance, the shell is shown with an end wall as before, but the cylindrical wall is bottle-shape, thereby providing a neck portion 19 to the case or shell. As before also, the said shell is situated concentric with respect to the lead-in wire, but in this instance the neck-portion of the shell engages and is supported directly by the lead-in wire to which it is attached.

In Figures 5 and 6 the lamp illustrated provides an envelope 20 with quite a long re-entrant stem 21 for lead-in wires as usual in the art. A band 22 containing granular activated alumina held by a suitable binder may be applied in a manner to encircle the stem and remain permanently thereon, as in Figure 5 where nothing else obstructs the outer surface of the stem. In the eventuality of the stem having an electrode-mounting collar 23 thereon, as in Figure 6, it will be convenient to attach thereto a perforated shell or case 24 containing the proper selection as to size of the granular lump or activated alumina.

The activated alumina, in whatever size selected and by whichever method of mounting desired, is positioned within the envelope of the lamp or the like during fabrication. After such mounting of the alumina, and before sealing-off of the lamp, the envelope is baked and evacuated. The baking and out-gassing which is a normal part of lamp manufacture, is sufficient to almost completely free the alumina from water vapor content absorbed from the air and puts it in most absorbent or re-activated state. It is desirable that the alumina be thus reactivated by heating at or near the end of the exhaust cycle to prevent reabsorption of water vapor given off by the glass wall and other parts of the lamp or tube structure which would diminish its effectiveness after seal-off The reactivation of the alumina by heat expels its water content, and as the envelope is then in process of exhaustion, the greater proportion of water vapor is thereby withdrawn. The envelope is then sealed-off, and since the reactivated alumina presents reversible absorptive properties, as the envelope cools, the alumina cools and absorbs remaining traces of water vapor left within the envelope. Absorption of water vapor continues whenever traces appear during life of the lamp. The functioning of the activated alumina as a getter does not subject the lamp to any explosive action or spattering of the getter either during manufacture or during use or life of the lamp or tube. The alumina is readily handled, remains intact in place, is chemically inert, itself economical, and requires no steps in reactivation or functioning outside of normal baking and outgassing of the envelope. The reactivated alumina as a getter has proven successful and highly advantageous in ballast lamps, fluorescent lamps, sterilizing lamps and others. It has particular advantage in those utilizing mercury or mercury vapor, since it is found that activated alumina is not subject to amalgamation by the mercury, which occurs with respect to other usual dehydrating getters, among which are barium, magnesium, calcium and the like. Our improved getter is indeed applicable to many types of lamps and tubes of which the drawing attempts to show but a limited number, and the method of heating or reactivation as well as of mounting or application will depend upon the structure and operating condition of the tube or lamp. It may therefore be mentioned with respect to the ballast lamp above referred to, that in that lamp hydrogen gas must necessarily be present for successful operation of the lamp. Accordingly, the present getter which absorbs water vapor primarily with little, if any, absorption of or action upon other gases, can be used in the presence of such gases as hydrogen, nitrogen and other gases which the usual getters are intended to absorb.

Since the various details of manufacture of the activated alumina and of its incorporation as a getter in lamps and the like of various construction, are subject to variation and change without departing from the inventive concept or scope of the invention, it is intended that all matter contained in the specification or illustrated in the drawing shall be interpreted as exemplary and not in a limiting sense. It is also to be understood that the following claims are intended to cover all of the generic and specific features of the invention herein shown and described, and all statements of the scope of the invention herein set forth as a matter of language which might be said to fall therebetween.

We claim:

1. A water vapor getter for lamps and the like comprising activated alumina.

2. A water vapor getter for lamps and the like comprising reactivated alumina.

3. A water vapor getter for lamps and the like comprising alumina situated and reactivated within the lamp.

4. A getter for lamps comprising alumina in a state inert chemically and water vapor absorptive.

5. A getter for lamps comprising alumina in a state inert chemically and having reversible water vapor absorptive properties.

6. A lamp providing an envelope, a non-flashing chemically inert getter comprising alumina mounted in place in the envelope and reactivated in place by baking to be absorptive of water vapor.

7. A lamp providing an envelope, a non-flashing chemically inert getter comprising alumina mixed with a binder and mounted therewith and thereby in place in the envelope.

8. A lamp providing an envelope, a perforated shell mounted in said envelope, and a non-flashing chemically inert getter comprising alumina in lumps larger than the perforations in said shell and retained in said shell after sealing-off of the lamp.

9. In combination with a lamp or like envelope, a water vapor absorbing getter comprising alumina sealed in said envelope and effective therein during use of the lamp for absorbing water vapor during life of the lamp.

CHARLES MORSE SLACK.
LOUIS FREDERICK EHRKE.